United States Patent
Berckmans et al.

[11] Patent Number: 6,009,763
[45] Date of Patent: Jan. 4, 2000

[54] FLOW SENSOR AND IMPELLER THEREFOR

[75] Inventors: Daniel Albert Berckmans, Kessler-Lo; Erik Joannes Vranken, Koersel-Beringen; Victor Goedseels, Kessler-Lo, all of Belgium; Gijs Jansen, Deurne, Netherlands

[73] Assignee: Fancom B.V., Panningen, Netherlands

[21] Appl. No.: 08/809,856

[22] PCT Filed: Oct. 3, 1995

[86] PCT No.: PCT/NL95/00335

§ 371 Date: Jun. 16, 1997

§ 102(e) Date: Jun. 16, 1997

[87] PCT Pub. No.: WO96/10733

PCT Pub. Date: Apr. 11, 1996

[30] Foreign Application Priority Data

Oct. 4, 1994 [NL] Netherlands ............................ 9401632

[51] Int. Cl.[7] .............................. G01F 1/05; F23J 13/08; B63H 1/26; F24F 7/007

[52] U.S. Cl. .................... 73/861.79; 73/861.77; 454/3; 454/229; 416/223 R

[58] Field of Search ............................ 73/861.77, 861.79; 415/98; 416/222 R, DIG. 2; 454/3, 9, 229

[56] References Cited

U.S. PATENT DOCUMENTS

| | | |
|---|---|---|
| 4,219,917 | 9/1980 | Bearden et al. . |
| 4,481,020 | 11/1984 | Lee et al. . |
| 4,900,222 | 2/1990 | Meng et al. ............................ 415/143 |
| 5,112,192 | 5/1992 | Weetman ............................ 416/223 R |
| 5,145,317 | 9/1992 | Brasz ................................... 415/224.5 |
| 5,156,524 | 10/1992 | Forni .................................... 415/182.1 |
| 5,158,434 | 10/1992 | Weetamn ........................... 416/223 R |

FOREIGN PATENT DOCUMENTS

| | | |
|---|---|---|
| 0100214 | 2/1984 | European Pat. Off. . |
| 0545499 | 6/1993 | European Pat. Off. . |
| 0589532 | 3/1994 | European Pat. Off. . |

*Primary Examiner*—Harshad Patel
*Attorney, Agent, or Firm*—Weingarten, Schurgin, Gagnebin & Hayes LLP

[57] ABSTRACT

An air flow sensor and impeller flow for use in industrial, agricultural and civil applications as well as in process control, emission control and measurement. The impeller is suspended for free rotation in a tube section and has a central core and a number of impeller blades extending from the core wherein at least one blade extends from the core to the adjacent inner wall of the tube section. The flow sensor is equipped with measuring means to measure the number of revolutions of the impeller per unit of time and to register an associated calibration speed of the impeller.

23 Claims, 3 Drawing Sheets

FLOW SENSOR AND IMPELLER THEREFOR

The invention relates to a flow sensor, in particular suitable for use in air flow measuring, comprising an impeller suspended for free rotation in a tube section.

With known flow sensors of the above-mentioned type, a fan impeller is for instance used as impeller, arranged in a tube section so as to be freely rotatable therein. The rotations of the impeller are measured, whereupon the flow rate through the tube section is determined with some precision. With the known flow sensors, the relation between a measured speed and the flow rate through the tube section is not linear and moreover depends on the pressure drop over the measuring system. In particular at low speeds and small flow rates, and at great pressure differences over the tube section, a highly deviant behavior may be created.

A fan impeller is designed so that a rotation energy can thereby be converted into an air movement. The number of blades and the blade configuration of the fan impeller are selected to that end. When such a fan impeller is employed as a freely rotating fan impeller, i.e. a fan impeller not driven by means of a motor or a like means, the relation between the rotary speed and the flow rates through the surface covered by the impeller will deviate substantially from a linear relation, in particular at low speeds and/or great pressure differences between the two sides of the impeller, and will moreover be directly dependent on the pressure difference over the tube section.

At low speeds and great pressure differences, air will be led back through the impeller, the so-called back-flow, which causes the rotary speed of the impeller to be changed at a constant flow rate, for instance as a result of an adjacently disposed ventilating fan. Moreover, a fan impeller typically causes strong air turbulences, which also causes the action of the flow sensor to be adversely affected. This means that such flow sensors have a poor measuring characteristic, in particular at low flow rates, and that these known flow sensors are in particular not pressure-independent.

The object of the invention is to provide a flow sensor of the type described in the opening paragraph, wherein the drawbacks mentioned are avoided while the advantages are maintained.

The blade angles of the different cross sections of the blades of the impeller of the flow sensor according to the invention provide a flow sensor having an almost pressure-independent measuring characteristic within the measuring range of the flow sensor. The calibration combination to be referred to as design couple, consisting of a calibration flow rate and a calibration speed can be selected so that this measuring characteristic can readily be adapted to the measuring means and further means, if any, for the processing of the registered speeds of the impeller during use. The characteristic, given according to the invention, of the curve of the blade angles over the blades of the impeller offers the advantage that, starting from a design couple suitable for the desired use and from a suitable tube section diameter, a substantially pressure-independent flow sensor can always be obtained, i.e. for any application a flow sensor can be designed having a substantially linear measuring characteristic, which measuring characteristic comprises at least the design couple selected. Owing to its construction, in particular in combination with a suitable material selection, the flow sensor is suitable for use in dusty and corrosive environments, at strongly varying temperatures and at different humidities. The flow sensor can be used for gas flow measurement, but is also suitable for use in fluid flow measurement.

A flow sensor according to the invention is in particular suitable for use in industrial, agricultural and civil utilizations in respect of air conditioning, process control, emission control, emission measurement in practical circumstances and the like.

When a flow sensor with a freely-rotating impeller is used, it is important that the speed of the impeller during use remains within given limits at a minimum and maximum flow rate to be measured, so as to preclude disturbances of the measuring characteristic. At unduly high speeds, movements of the blades will result in an erratic behavior of the impeller, which adversely affects the measuring precision and the sensitivity. Moreover, at unduly high speeds of the impeller, unacceptable noise production and wear occur. At unduly low speeds, the measuring precision of the flow sensor becomes too low.

By providing the impeller with two, preferably diametrically opposite blades, a stable impeller is obtained which can be bearing-mounted in a simple manner, because only minimum forces are exerted on the bearing. After all, unlike the impeller of the known flow sensors, the impeller according to the invention is not designed for the transfer of energy. Only the friction of the bearing needs to be overcome. Moreover, only a very small part of the frontal surface of the tube section is covered by a stationary impeller. Owing to these measures, the flow resistance, and accordingly the impact of the impeller on the flow pattern in the tube section are minimal. Because the blades extend to adjacent the inner wall of the tube section, the entire tube section is covered during one revolution of the impeller. With the impeller according to the invention, this has the advantage of rendering the motional pattern thereof independent of the flow pattern in the tube section. The flow sensor according to the invention can be used with both turbulent and laminar flow in the tube section without affecting the measuring characteristic, while in each case, the flow sensor keeps functioning accurately.

By disposing a ventilating fan in the tube section, a compact device is obtained which can easily be installed, while the impeller and the ventilating fan can be adjusted to each other in an optimum manner. Arrangement of the ventilating fan downstream of the impeller results in a high accuracy of the flow sensor.

The opposite directions of rotation of the ventilating fan and the impeller produces an advantageous flow pattern within the tube section, which prevents disadvantageous disturbances of the measuring characteristic, for instance caused by undesired vibrations.

An impeller can particularly advantageously be arranged within a tube section and is then suitable for use with a flow sensor, because it has substantially a pressure-independent rotation characteristic. The impeller can easily be adapted to the diameter of a suitable tube section, in such a manner that at one rotation of the impeller within the tube section, substantially the entire cross section of that tube section is covered by the blades.

The invention moreover relates to a ventilating device, in particular suitable for use for the ventilation of spaces, and to a method for the manufacture of a flow sensor, comprising a freely-rotating impeller disposed in a tube section.

To explain the invention, exemplary embodiments of a flow sensor and a ventilating device will hereinafter be described with reference to the accompanying drawings, wherein.

Figure 3:
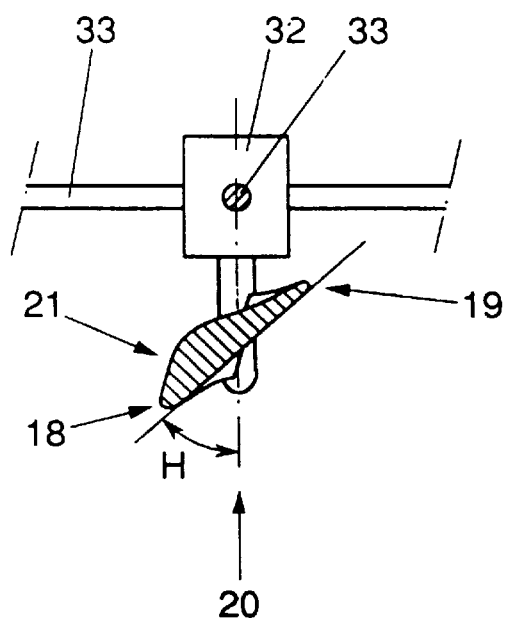
FIG. 3 is a sectional view of an impeller taken on the line III—III in FIG. 2.
Figure 4:
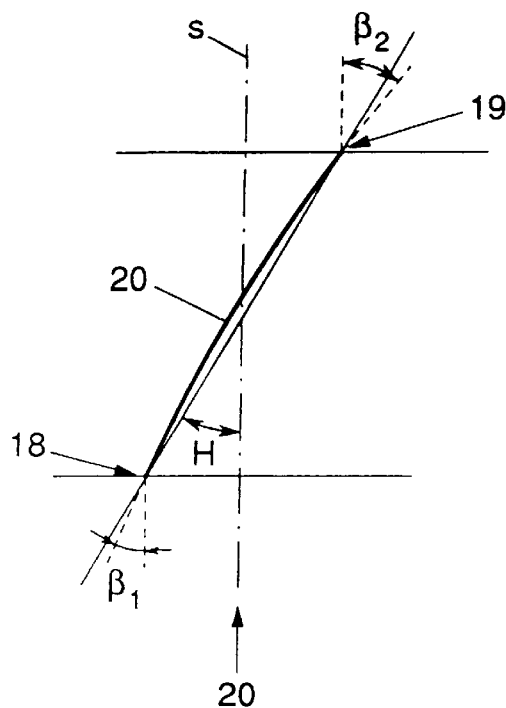
Figure 5:
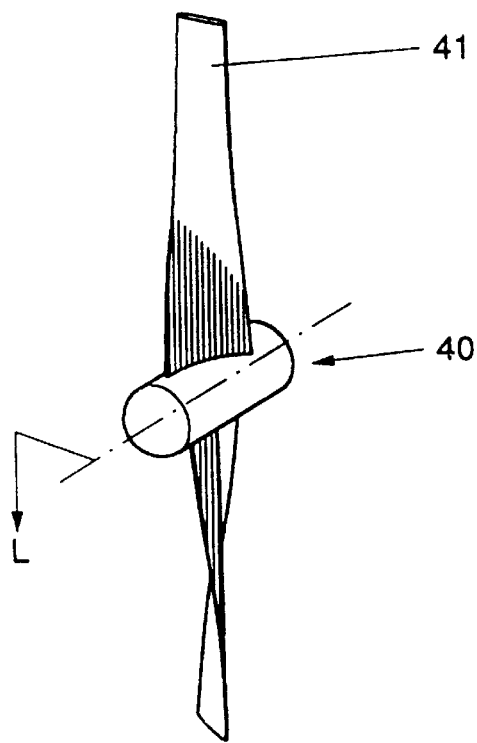

FIG. 4 schematically shows the bottom side of a blade cross section according to FIG. 3; and FIG. 5 is a front view of an impeller.

Figure 1:
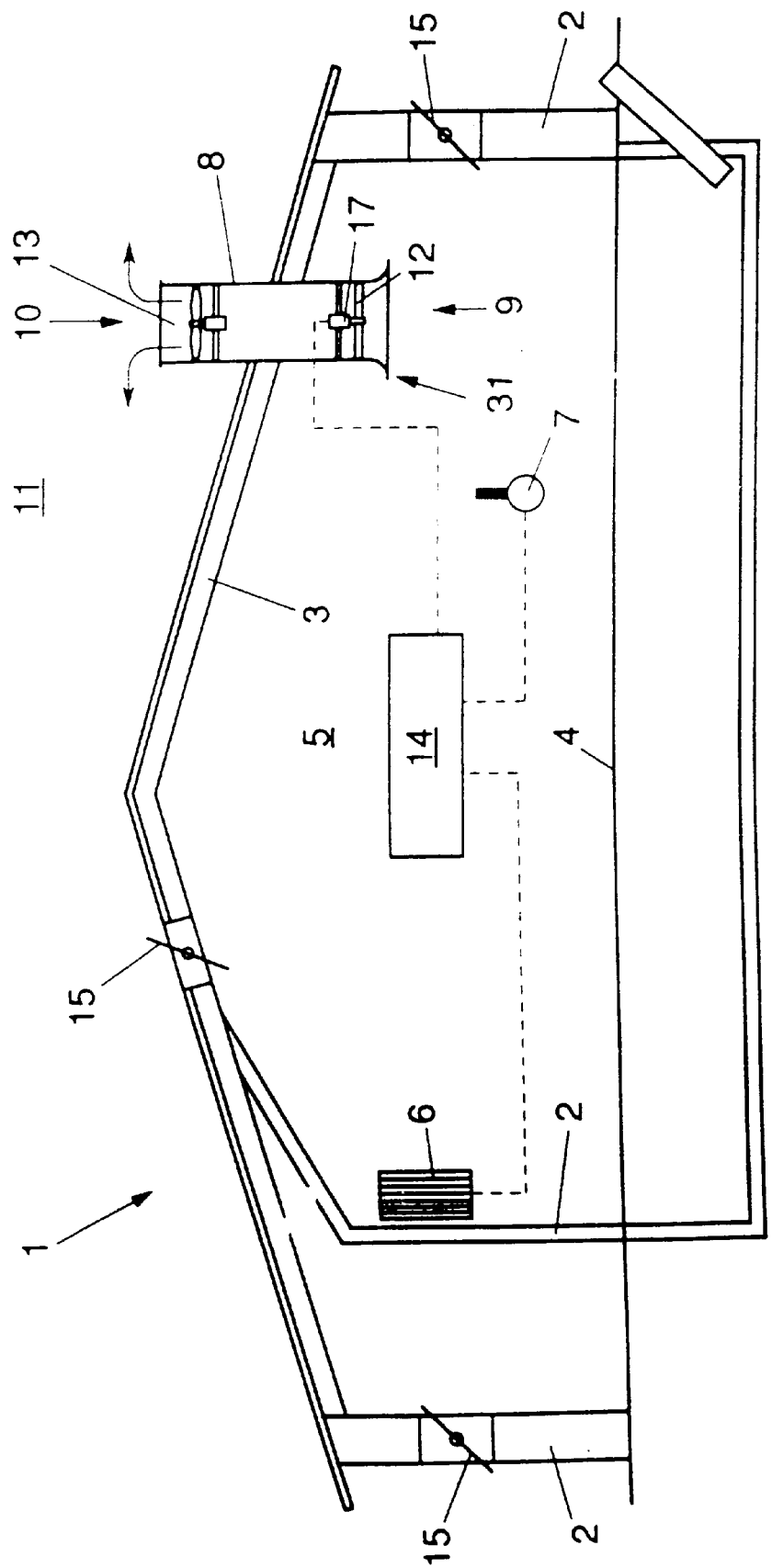
FIG. 1 is a sectional view of a stable comprising a ventilating device.

FIG. 1 shows a stable 1 comprising an inner space 5 defined by a number of walls 2, a roof 3 and a floor 4. Provided in the inner space 5 are heating means 6 and measuring means 7 for determining the composition of the air in the inner space 5. Provided in the roof 3 is a tube section 8 communicating by a first open end 9 with the inner space 5 and connecting by the opposite, second open end 10 to the outer space 11 of the stable 1. In the tube section 8, which has a circular inner section, an impeller 12 is freely rotatably suspended adjacent the inwardly facing first open end 9, which impeller 12 will be further discussed hereinafter. Adjacent the second open end 10, a ventilating fan 13 is disposed in the tube section, by means of which ventilating fan air can be discharged from the inner space 5 to the outer space 11 via the tube section 8.

The heating means 6, the air composition-measuring means 7, the impeller 12 and the ventilating fan 13 are all connected to a control unit 14, for instance a computer-controlled regulating unit. Also connected to the regulating unit 14 are controlled ventilation-regulating valves 15 in the walls 2, the roof 3 and/or the floor 4. On the basis of the air composition measured, the ventilation-regulating valves 15 are controlled into the open and closed positions, the ventilating fan 13 being controlled in such a manner that a desired air flow, necessary for freshening the air in the inner space 5, is discharged through the tube section 8. In this connection, it is important that the air flow discharged is accurately determined and regulated to obtain an optimum ventilation of the inner space 5, without for instance wasting unduly much heat and without causing draft.

The impeller 12 comprises two blades 16, disposed diametrically opposite each other and attached to a core 30 which is bearing-mounted in a housing 32 so as to be smooth-running, which housing is centrally suspended within the tube section by means of a number of radial spokes 33. The core 30 has a small frontal surface and is aerodynamically shaped, so that the flow pattern of the air within the tube section 8 is minimally affected by the core 30. The axis of rotation S of the impeller 12 coincides with the longitudinal axis of the tube section 8. The blades 16 extend to near the inner wall of the tube section 8. The distance between the inner wall of the tube section 8 and the free end of the blade 16 is less than 2% of the diameter of the tube section, and is preferably approximately 1%. Accordingly, almost the entire cross section of the tube section is covered by the blades 16 during use, enabling the flow sensor to be used both in the case of turbulent flow and in the case of laminar flow in the tube section. Preferably, the direction of rotation of the impeller is opposite to the direction of rotation of the ventilating fan.

In the embodiment shown, the tube section is at its first open end 9 provided with an outwardly bent inflow edge 31 whose curvature radius R is greater than 10% of the diameter D of the tube section. The impeller is preferably disposed either at the level of the inflow edge 31 or at a distance from the inflow edge 31 which is at least half the diameter D of the tube section 8. By using of one of these configurations, influence of the inflow pattern of the air in the tube section 8 on the measuring characteristic of the flow sensor is prevented. Further, for that purpose, the impeller 12 and the ventilating fan 13 are spaced apart a distance at least corresponding to the diameter D of the tube section 8.

For measuring the flow rate through the tube section 8, the impeller 12 comprises measuring means 17 for determining the speed of the impeller 12. The speed measured is an indication for the flow rate on the basis of which for instance the rotary speed of the ventilating fan 13 can be adjusted, the position of the different regulating valves 15 can be accommodated and the heating 6 can be readjusted, by means of the regulating unit 14.

To enable the flow rate to be calculated from the speed of the impeller 12 in a cheap and reliable manner, it is important that there is a linear relation between the flow rate and the speed measured, regardless of pressure differences between the inner space 5 and the outer space 11 and regardless of the flow pattern within the tube section 8. This linear relation is substantially determined by the configuration of the impeller 12, and in particular by the blade configuration.

Figure 2:
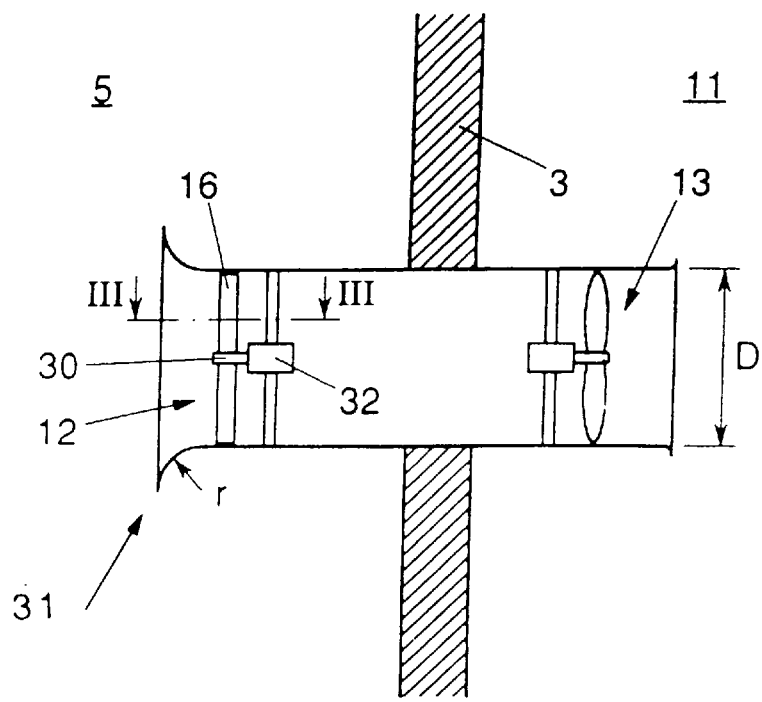
FIG. 2 is a partially sectional side elevation of a flow sensor according to the invention.

For this purpose, to the blades 16 of the impeller 12, as shown in FIG. 2, it applies that the blade angle H of each section meets the equation $$[tg(H(r))*Caldeb*C]/[r*D^2]=Calrev \qquad [1]$$

wherein r=distance section relative to the center of the core (m);

H(r)=blade angle of section at distance r (°);

Caldeb=calibration flow rate (m³/h)

Calrev=calibration speed (rev/min)

D=diameter tube section (m)

wherein C lies between 0.003 and 0.004 and is preferably 6.67/1974. In practice the blade angle preferably differs maximally 3° from the optimum blade angle.

The blade angle H is defined as the angle included by the blade 16 with the axis of rotation S of the impeller 12, as is shown in FIG. 3.

For calculating the suitable configuration for the blades 16, a calibration combination K is started from, which can be referrred to as a design couple suitable for the application and consists of a calibration flow rate Caldeb and an associated calibration speed Calrev. The design couple K is inter alia selected on the basis of the regulating unit 14 and the speed-measuring means 17 to be used, and forms a point on the measuring characteristic of the flow sensor. As an example, Table 1 shows the blade angles of an impeller 12 which is pressure-independent, and hence particularly suitable for use in a flow sensor according to the invention.

TABLE 1

| Caldeb | 500 m³/h | Maxdeb | 8,000 m³/h |
|---|---|---|---|
| Calrev | 125 rev/min | Maxrev | 2,000 rev/min |
| D | 0.45 m | Mindeb | 120 m³/h |
| C | 0.0034 | Minrev | 30 rev/min |

| r (m) | H(r) (°) | B (m) |
|---|---|---|
| 0.05 | 36.8 | 0.100 |
| 0.06 | 42.0 | |
| 0.07 | 46.4 | |
| 0.08 | 50.2 | |
| 0.09 | 53.4 | |
| 0.10 | 56.3 | 0.061 |
| 0.11 | 58.8 | |
| 0.12 | 60.9 | |
| 0.13 | 62.8 | |
| 0.14 | 64.5 | |
| 0.15 | 66.0 | 0.051 |

TABLE 1-continued

| | | |
|---|---|---|
| 0.16 | 67.4 | |
| 0.17 | 68.6 | |
| 0.18 | 69.7 | |
| 0.19 | 70.6 | |
| 0.20 | 71.5 | 0.047 |
| 0.21 | 72.4 | |

Subsequently, for a further optimization of the flow sensor, and in particular the impeller 12, for at least the larger part of each blade 16, a suitable blade width B is determined for each section, meeting the equation $$[r_1*\cos(H_1)*B_1]/[r_2*\cos(H_2)*B_2]>1 \qquad [2]$$

wherein:
- $r_1$=distance first section relative to the center of the core (m);
- $r_2$=distance second section relative to the center of the core (m);

wherein $r_2>r_1$;
- $H_1$=blade angle first section (°);
- $H_2$=blade angle second section (°);
- $B_1$=Blade width first section (m); and
- $B_2$=Blade width second section (m), wherein to all blade angles of the impeller it applies that they lie in one quadrant and the the blade angle H and blade width B have a flowing curve over the blade. For the use of the impeller in an air flow sensor in a situation as shown in FIG. 1, the width of the blade should preferably be between 1 and 15 cm. For the embodiment described in Table 1, a blade width B of 10 cm at a distance of 5 cm is started from. The curve of the width over the blade is shown in Table 1 in the right-hand column. In the embodiment shown, the core has a diameter of approximately 10 cm.

In the case of air flow measurement by means of a freely rotating impeller, the speed should preferably be kept within a specific range. Unduly high speeds of the impeller 12 involve a great chance of instability of the blades 16 of the impeller, which adversely affects the measuring characteristic. Moreover, this causes substantial wear of the different components of the device and an unpleasant noise level. At unduly low speeds, the measuring accuracy of the flow sensor is too easily adversely affected.

Given a maximum and minimum allowable speed, a maximum and minimum measurable flow rate can be determined for each impeller 12 on the basis of the equations $$[tg(H(r)_{max})*Maxdeb*C]/[r*D^2]<Maxrev \qquad [3]$$

and $$[tg(H(r)_{min})*Mindeb*C]/[r*D^2]<Minrev \qquad [4]$$

wherein:
- $H(r)_{max}$=maximum blade angle section at distance r (°);
- $H(r)_{min}$=minimum blade angle section at distance r (°);
- Maxdeb=maximum measuring flow rate (m³/h)
- Mindeb=minimum measuring flow rate (m³/h)
- Maxrev=maximum measuring speed (rev/min)
- Minrev=minimum measuring speed (rev/min)

By filling in a blade angle H and the maximum allowable speed in the upper equation [3], the maximum measurable flow rate can easily be determined, by filling in the blade angle H and the minimum allowable speed in the lower equation [4], the minimum measurable flow rate can easily be determined.

Conversely, on the basis of the same equations [3], [4], it is also possible to calculate a maximum allowable blade angle for each section on the basis of the maximum flow rate to be measured and the maximum allowable speed therefor, and, likewise, to calculate a minimum blade angle for each section by filling in a minimum flow rate to be measured and a minimum speed required therefor. This offers the possibility of determining, prior to the determination of the blade angles for an impeller 12, the design limits on the basis of which a favorable calibration combination K can be selected. Table 2 shows the maximum and minimum blade angle $H(r)_{max}$, $H(r)_{min}$ for the different sections for an impeller, starting from the design criteria given in the heading of Table 2.

TABLE 2

| | | |
|---|---|---|
| Maxdeb | | 6,000 m³/h |
| Maxrev | | 2,000 r/min |
| Mindeb | | 200 m³/h |
| Minrev | | 30 r/min |
| D | | 0.45 m |
| C | | 0.0034 |

| radius m | min. angle (°) | max. angle (°) |
|---|---|---|
| 0.05 | 24.2 | 45 |
| 0.06 | 28.3 | 50.2 |
| 0.07 | 32.2 | 54.4 |
| 0.08 | 35.7 | 58 |
| 0.09 | 39 | 60.9 |
| 0.10 | 42 | 63.4 |
| 0.11 | 44.7 | 65.5 |
| 0.12 | 47.2 | 67.4 |
| 0.13 | 49.4 | 68.9 |
| 0.14 | 51.5 | 70.3 |
| 0.15 | 53.4 | 71.5 |
| 0.16 | 55.2 | 72.6 |
| 0.17 | 56.8 | 73.6 |
| 0.18 | 58.3 | 74.5 |
| 0.19 | 59.7 | 75.2 |
| 0.20 | 60.9 | 76 |
| 0.21 | 62.1 | 76.6 |
| 0.22 | 63.2 | 71.2 |
| 0.23 | 64.2 | 77.7 |
| 0.24 | 65.1 | 78.2 |
| 0.25 | 66 | 78.7 |
| 0.26 | 66.8 | 79.1 |
| 0.27 | 67.6 | 79.5 |
| 0.28 | 68.3 | 79.9 |

When a design couple K has been selected, the optimum blade angles H can be determined by filling in the first equation [1]. If it appears that the blade angles H found lie too much outside the limit values found with the third and fourth equations [3], [4], an adjusted design couple K can be selected. In this manner, the curve of the blade angles can easily be optimized. Next, for each blade section the width can be determined on the basis of the second equation [2], in such a manner that the blade configuration meets the requirements set and is hence pressure-independent and provides a desired, linear measuring characteristic of a suitable accuracy.

FIG. 3 shows a cross section of a blade 16 of an impeller 12. The blade 16 has a front side 18, a rear side 19, a leading side 20 and a bent top side 21. In the embodiment shown, the leading side 20 is substantially flat, which has a positive influence on the pressure-independence of the impeller. The curvature of the blade, given by the difference between the inflow angle $\beta_1$ and the outflow angle $\beta_2$, as shown in FIG.

4, is less than 5°, and preferably about 0°. The maximum thickness of the blade is about 10% of the blade width, and is located at about ⅓ of the blade width, measured from the front side 18 of the blade 16. The blade angle H corresponds to the average of the inflow angle $\beta_1$ and the outflow angle $\beta_2$.

FIG. 5 shows an impeller 40 suitable for use in a flow sensor which is pressure-independent. The blade angles $H_1$, $H_2$ of two sections at different distances $r_1$, $r_2$ from the core 30 meet the equation $$(r_2/r_1)*\tan(H_1 = \tan(H_2) \qquad [5]$$

wherein $r_1$=distance first section relative to the center of the core (m);
$r_2$=distance second section relative to the center of the core (m);
$H_1$=blade angle first section (°);
$H_2$=blade angle second section (°).

Starting from such an impeller 40, a flow sensor can be assembled in a simple manner which is almost pressure-independent. For that purpose, a suitable tube section diameter D can for instance be determined starting from a selected blade angle for one of the cross sections of a blade 41 and a suitable design couple K by filling in these values in the first equation [1]. Then, the length L of the blades 41 can be adjusted to that tube section. When the values found and a maximum allowable speed are filled in in the second equation [2], an upper limit for the measuring range of the flow meter is then given, and, similarly, when the third equation [3] is filled in, a lower limit is given. Since the flow sensor has a linear measuring characteristic, it can readily be determined whether this maximum speed therefor will actually occur. When this threatens to be exceeded, a different calibration combination will have to be selected to which, accordingly, a different diameter of the tube section will be associated. In this manner, the suitable configuration of a pressure-independent flow sensor having the desired measuring range can in each case be obtained, starting from the impeller 40. Of course, starting from a design couple, it is also possible to determine for each tube section diameter the suitable blade angle by filling in the found values in equation [1].

With a method according to the invention a flow sensor can be obtained which can be used in, for instance, agricultural, industrial and civil applications for use in air conditioning, process control, emission measurement, and the like. The flow sensor can be used for, for instance, air and fluid flow measurement in corrosive and dusty environments, at different temperatures and degrees of humidity.

The flow sensor can be designed for measuring flow rates of between 200 and 6000 m³/h, but greater and smaller flow rates are also possible. The blade length of the impeller can at least vary between 15 and 40 cm, but greater and smaller blade lengths are also possible. The flow sensor according to the invention is at least usable at pressure differences between 0 and 120 Pa, and can achieve a measuring accuracy of approximately 60 m³/h or less over the selected measuring range. Of course, the invention is not limited to the embodiments as shown by way of example. Many variations are possible within the purview of the invention.

For instance, the impeller may be provided with a different number of blades and the flow sensor may be used without ventilating fan, for instance in the case of natural ventilation. Other sensors may be connected to the regulating unit, such as for instance mechanical switches and time switches.

In the regulating unit different regulating programs may be included, adapted to control a process wherein the flow sensor is included.

Starting from one of more of the parameters given, the flow sensor or the impeller according to the invention can in each case be optimally adjusted to the process to be controlled. In this connection, the selection of the magnitude of the parameters is understood to fall within the scope of anyone skilled in the art.

We claim:

1. A flow sensor, having an impeller which is suspended for free rotation in a tube section and which comprises a central core and a number of blades extending from the core, wherein at least one blade extends from the core to adjacent an inner wall of the tube section, wherein measuring means are included for measuring the number of revolutions of the impeller per unit of time, and wherein the flow sensor is adapted to register a calibration speed of the impeller associated with a calibration flow rate by a measuring means, wherein a blade angle in at least a series of cross sections of the blade substantially meets the formula $$[tg(H(r))*Caldeb*C]/[r*D^2] = Calrev$$

wherein r=distance section relative to the center of the core (m);
H(r)=blade angle of section at distance r (°);
Caldeb=calibration flow rate (m³/h)
Calrev=calibration speed (rev/min)
D=diameter tube section (m)

wherein 0.003<C<0.004 and C is preferably 6.67/1974.

2. A flow sensor according to claim 1, characterized in that to each cross section of the blade it applies that the blade angle substantially meets the formulae $$[tg(H(r)_{max})*Maxdeb*C]/[r*D^2] < Maxrev$$

and $$[tg(H(r)_{min})*Mindeb*C]/[r*D^2] < Minrev$$

wherein:

$H(r)_{max}$=maximum blade angle section at distance r (°);
$H(r)_{min}$=minimum blade angle section at distance r (°);
Maxdeb=maximum measuring flow rate (m³/h)
Mindeb=minimum measuring flow rate (m³/h)
Maxrev=maximum measuring speed (rev/min)
Minrev=minimum measuring speed (rev/min).

3. A flow sensor according to claim 2, characterized in that:

to substantially each combination of two cross sections of the blade it applies that $$[r_1*\cos(H_1)*B_1]/[r_2*\cos(H_2)*B_2] > 1$$

wherein:

$r_1$=distance first section relative to the center of the core (m);
$r_2$=distance second section relative to the center of the core (m);

wherein $r_2 > r_1$;

$H_1$=blade angle first section (°);
$H_2$=blade angle second section (°);
$B_1$=Blade width first section (m); and
$B_2$=Blade width second section (m);

wherein to all blade angles of the impeller it applies that they lie in one quadrant and that the blade angle (H) and blade width (B) have a flowing curve over the blade;

the impeller comprises two blades which together with the core cover the entire diameter of the relevant cross section of the tube section, the blades preferably being arranged diametrically opposite each other;

that the distance between the free end of each blade and the inner wall of the tube section is less than 2%, and preferably approximately 1% of the diameter of the tube section;

for each blade the blade curve at the leading side is less than 5°, and preferably approximately 0°;

to a cross section of each blade it applies that the cross section has the greatest thickness at a distance of about ⅓ of the blade width, measured from the front edge of the blade, the greatest blade thickness being preferably about 10% of the relevant blade width;

the core has a frontal surface of no more than approximately 10% of the internal cross section of the tube section;

the tube section, downstream of the impeller, a ventilating fan is arranged for drawing in air, via the tube section, from the side of the impeller remote from the ventilating fan and through the plane covered by the impeller during a revolution, and for delivering said air outside the tube section;

the ventilating fan rotates in a direction opposite to that of the impeller;

the distance between the blades of the ventilating fan and the blades of the impeller at least corresponds to the diameter of the tube section;

on the side of the impeller, the tube section comprises an outwardly bent inflow edge whose curvature radius is greater than 10% of the diameter of the tube section, the impeller being disposed at the level of the inflow edge.

4. A ventilating device, in particular suitable for use for the ventilation of spaces, wherein a flow sensor according to claim 3 is included, wherein switching means are included for regulating, on the basis of the speeds of the impeller registered by the measuring means and an air composition measured within the space, the amount of air to be discharged from the space by the flow sensor.

5. A flow sensor according to claim 1, characterized in that to substantially each combination of two cross sections of the blade it applies that $$[r_1 * \cos(H_1) * B_1]/[r_2 * \cos(H_2) * B_2] > 1$$

wherein:
$r_1$ = distance first section relative to the center of the core (m);
$r_2$ = distance second section relative to the center of the core (m);
wherein $r_2 > r_1$;
$H_1$ = blade angle first section (°);
$H_2$ = blade angle second section (°);
$B_1$ = Blade width first section (m); and
$B_2$ = Blade width second section (m),
wherein to all blade angles of the impeller it applies that they lie in one quadrant and that the blade angle (H) and blade width (B) have a flowing curve over the blade.

6. A flow sensor according to claim 1, characterized in that the impeller comprises two blades which together with the core cover the entire diameter of the relevant cross section of the tube section, the blades preferably being arranged diametrically opposite each other.

7. A flow sensor according to claim 1, characterized in that the distance between the free end of each blade and the inner wall of the tube section is less than 2%, and preferably approximately 1% of the diameter of the tube section.

8. A flow sensor according to claim 1, characterized in that for each blade the blade curve at the leading side is less than 5°, and preferably approximately 0°.

9. A flow sensor according to claim 1, characterized in that to a cross section of each blade it applies that the cross section has the greatest thickness at a distance of about ⅓ of the blade width, measured from the front edge of the blade, the greatest blade thickness being preferably about 10% of the relevant blade width.

10. A flow sensor according to claim 1, characterized in that the core has a frontal surface of no more than approximately 10% of the internal cross section of the tube section.

11. A flow sensor according to claim 1, characterized in that in the tube section, downstream of the impeller, a ventilating fan is arranged for drawing in air, via the tube section, from the side of the impeller remote from the ventilating fan and through the plane covered by the impeller during a revolution, and for delivering said air outside the tube section.

12. A flow sensor according to claim 11, characterized in that during use, the ventilating fan rotates in a direction opposite to that of the impeller.

13. A flow sensor according to claim 11, characterized in that the distance between the blades of the ventilating fan and the blades of the impeller at least corresponds to the diameter of the tube section.

14. A flow sensor according to claim 13, characterized in that on the side of the impeller, the tube section comprises an outwardly bent inflow edge whose curvature radius is greater than 10% of the diameter of the tube section, the impeller being disposed at a distance from the inflow edge which is at least half the diameter of the tube section.

15. A flow sensor according to claim 11, characterized in that on the side of the impeller, the tube section comprises an outwardly bent inflow edge whose curvature radius is greater than 10% of the diameter of the tube section, the impeller being disposed at the level of the inflow edge.

16. A flow sensor according to claim 11, characterized in that on the side of the impeller, the tube section comprises an outwardly bent inflow edge whose curvature radius is greater than 10% of the diameter of the tube section, the impeller being disposed at a distance from the inflow edge which is at least half the diameter of the tube section.

17. A ventilating device, in particular suitable for use for the ventilation of spaces, wherein a flow sensor according to claim 1 is included, wherein switching means are included for regulating, on the basis of the speeds of the impeller registered by the measuring means and an air composition measured within the space, the amount of air to be discharged from the space by the flow sensor.

18. An impeller for arrangement in a tube section, comprising a central core and a number of blades extending from the core, characterized in that to substantially each combination of two cross sections of the blade it applies that the blade angles meet the equation $$(r_2/r_1) * \tan(H_1) = \tan(H_2)$$

wherein
$r_1$ = distance first section relative to the center of the core (m);
$r_2$ = distance second section relative to the center of the core (m);

$H_1$=blade angle first section (°);

$H_2$=blade angle second section (°).

19. An impeller according to claim 18, characterized in that there is a calibration combination of a calibration flow rate and a calibration speed wherein to substantially each cross section of the blade it applies that the blade angle meets the formula $$[tg(H(r))*Caldeb*C]/[r*D^2]=Calrev$$

wherein r=distance section relative to the center of the core (m);

H(r)=blade angle at distance r (°);

Caldeb=calibration flow rate (m³/h)

Calrev=calibration speed (rev/min)

D=diameter intended tube section (m)

wherein 0.003<C<0.004 and C is preferably 6.67/1974.

20. A method of using the a flow sensor, comprising an impeller disposed in a tube section, said impeller having at least a core, a number of blades extending from the core, core bearing means, means for securing the core bearing means in a tube section and impeller rotation-measuring means, wherein, on the basis of the use of the flow sensor and the measuring range of the measuring means, a suitable tube section diameter and a suitable combination of a calibration flow rate and an associated calibration speed are selected, whereupon the blade angle of each cross section of the blade is determined, said blade angle meeting the equation $$[tg(H(r))*Caldeb*C]/[r*D^2]=Calrev$$

wherein r=distance section relative to the center of the core (m);

H(r)=blade angle of section at distance r (°);

Caldeb=calibration flow rate (m³/h)

Calrev=calibration speed (rev/min)

D=diameter tube section (m)

wherein 0.003<C<0.004 and C is preferably 6.67/1974.

21. A method according to claim 20, characterized in that a maximum and minimum flow rate to be measured during use and a maximum and minimum impeller speed desired therefor are determined, whilst for each cross section a blade angle is selected to which it applies that it lies between two limit values $H(r)_{max}$ and $H(r)_{min}$ meeting the following formulae $$[tg(H(r)_{max})*Maxdeb*C]/[r*D^2]<Maxrev$$

and $$[tg(H(r)_{min})*Mindeb*C]/[r*D^2]<Minrev$$

wherein:

r=distance section relative to the center of the core (m);

$H(r)_{max}$=maximum blade angle section at distance r (°);

$H(r)_{min}$=minimum blade angle section at distance r (°);

Maxdeb=maximum flow rate (m³/h)

Mindeb=minimum flow rate (m³/h)

Maxrev=maximum speed (rev/min)

Minrev=minimum speed (rev/min)

wherein 0.003<C<0.004 and C is preferably 6.67/1974.

22. A method according to claim 21, characterized in that for each cross section of each blade, a width and blade angle are determined so that to substantially each combination of two cross sections of the blade, it applies that $$[r_1*\cos(H_1)*B_1]/[r_2*\cos(H_2)*B_2]>1$$

wherein:

$r_1$=distance first section relative to the center of the core (m);

$r_2$=distance second section relative to the center of the core (m);

wherein $r_2>r_1$;

$H_1$=blade angle first section (°);

$H_2$=blade angle second section (°);

$B_1$=Blade width first section (m); and $B_2$=Blade width second section (m);

and so that to all blade angles of the impeller it applies that they lie in one quadrant and that the blade angle (H) and blade width (B) have a flowing curve over the blade.

23. A method according to claim 20, characterized in that for each cross section of each blade, a width and blade angle are determined so that to substantially each combination of two cross sections of the blade, it applies that $$[r_1*\cos(H_1)*B_1]/[r_2*\cos(H_2)*B_2]>1$$

wherein:

$r_1$=distance first section relative to the center of the core (m);

$r_2$=distance second section relative to the center of the core (m);

wherein $r_2>r_1$;

$H_1$=blade angle first section (°);

$H_2$=blade angle second section (°);

$B_1$=Blade width first section (m); and $B_2$=Blade width second section (m);

and so that to all blade angles of the impeller it applies that they lie in one quadrant and that the blade angle (H) and blade width (B) have a flowing curve over the blade.

\* \* \* \* \*

UNITED STATES PATENT AND TRADEMARK OFFICE
CERTIFICATE OF CORRECTION

PATENT NO. : 6,009,763  
DATED : January 4, 2000  
INVENTOR(S) : Daniel Albert Berckmans et al.

Page 1 of 1

It is certified that error appears in the above-identified patent and that said Letters Patent is hereby corrected as shown below:

Title page,
Item [75], Inventors, "Daniel Albert Berckmans, Kessler-Lo;" should read -- Daniel Albert Berckmans, Kessel-Lo; --; and "Kessler-Lo, all of Belgium;" should read -- Kessel-Lo, all of Belgium; -- and Column 6,
Line 42, Table 2, column 3, "71.2" should read -- 77.2 --.

Signed and Sealed this

Seventh Day of May, 2002

Attest:

*Attesting Officer*

JAMES E. ROGAN
*Director of the United States Patent and Trademark Office*